July 6, 1943.  C. N. SKINNER  2,323,685
PARTIAL DENTURE
Original Filed Jan. 17, 1941
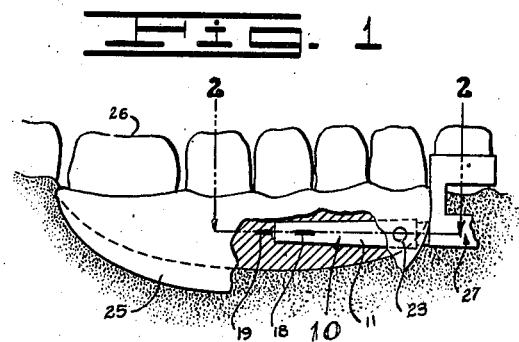
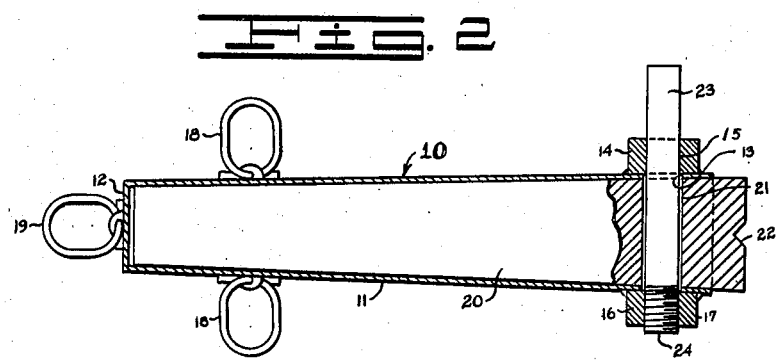
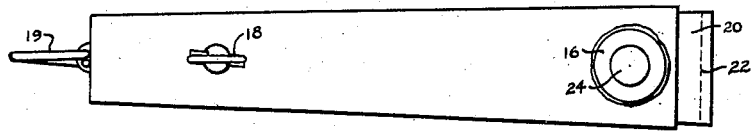
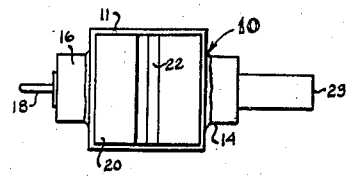
INVENTOR.
C. N. SKINNER
BY

Patented July 6, 1943

2,323,685

UNITED STATES PATENT OFFICE 2,323,685

PARTIAL DENTURE

Clawson N. Skinner, Whittier, Calif.

Original application January 17, 1941, Serial No. 374,848. Divided and this application March 30, 1942, Serial No. 436,755

3 Claims. (Cl. 32—5)

This invention relates to improvements in partial dentures.

The general object of the invention is to provide an improved means for connecting a partial denture saddle to an anchoring means.

Another object of the invention is to provide a novel, detachable means for connecting a partial denture saddle to a securing means.

A further object of the invention is to provide novel means for connecting a partial denture saddle to an anchoring means in such manner as to provide restricted universal movement of the denture saddle.

Other objects and advantages of this invention will be apparent from the following description taken in connection with the accompanying drawing wherein:

Fig. 1 is a side view, partly in section, showing my denture;

Fig. 2 is an enlarged section through the connector member taken on line 2—2 of Fig. 1;

Fig. 3 is a side elevation of the device shown in Fig. 2, and

Fig. 4 is an end view of the device.

This application is a division of my copending application, Serial Number 374,848, filed January 17, 1941, now Patent No. 2,279,351, granted April 14, 1942.

Referring to the drawing by reference characters, I have indicated my improved connector device generally at 10. As shown, the device consists of a saddle secured on the jaw.

As shown, the device 10 includes an elongated, hollow, thin metal housing 11 closed at one end as at 12 and convergingly tapered from the open end towards the closed end. Adjacent the open end the housing has a pair of opposed apertures 13 in the side walls thereof and exterior thereto on one side the housing has a washer member 14 soldered thereto which has an aperture 15 therein co-axial with the housing apertures 13. Opposite the washer 14 the housing has a similar washer 16 soldered thereto which has a threaded aperture 17 therein co-axial with the housing apertures 13. Wire loops 18 are soldered to the sides of the housing and the closed end 12 has a wire loop 19 soldered thereto.

The device 10 further includes a bar member 20 which is tapered to conform to the shape of the housing 11 in which it is adapted to be positioned. Adjacent the large end thereof the bar 20 has a transverse aperture 21 therein and in the face of the large end it has a groove 22 therein.

To form a denture using the device 10 the bar 20 is positioned in the housing 11 and connected thereto by a pin 23 having a threaded portion 24 adjacent one end thereof. The pin 23 is positioned in the housing washer aperture 15, in the housing aperture 13 and in the bar aperture 21 with the threaded portion positioned in the threaded aperture 17 of the housing washer 16.

The assembled device 10 is then correctly positioned in the denture base area and the base 25 of a denture plate 26 is cast around the device 10, leaving the large end of the bar 20 substantially flush with the end of the finished base. Before or after the denture plate 26 is processed, the large end of the bar 20 is soldered to a suitable anchor band such as indicated at 27. The groove provides a channelway for the solder to flow into when the bar is being secured to the anchor band. The bar 20 may be relieved at various places to alloy slight restricted universal movement between it and the housing 11, to provide a more comfortable fit.

From the foregoing description it will be apparent that I have provided a novel partial denture connector device which is simple and is so constructed that it has a desired slight restricted universal movement to facilitate adjustment and to provide comfort for the wearer.

Having thus described my invention, I claim:

1. In an anchor device for a partial denture, an elongated bar having an anchor member thereon, said bar having plane faces converging from the anchor, a hollow elongated metal housing having an open end receiving said bar, said housing being complemental to the bar, said housing having washers secured on the outside thereof, a pin passing through said washers and engaging the same, said bar having an aperture receiving said pin, said aperture being larger than the diameter of the pin, whereby the pin is loosely held on the bar and a plurality of anchoring loop members mounted on the sides and end of the housing.

2. In an anchor device for a partial denture, an elongated bar having a substantially vertical end portion for engaging an anchor member, said bar having planar vertical side faces and planar top and bottom faces converging from the anchor, the longitudinal axis of said bar being substantially horizontal, a hollow elongated metal housing having an open end receiving said bar, said housing being complemental to the bar, said housing being adapted to be arranged at the root end of the teeth in a partial denture, said housing having washers secured on the outside of the vertical side faces thereof, and a pin passing through said washers and secured to one of the washers, said bar having an aperture receiving said pin, said bar aperture being larger than the diameter of the pin, whereby the pin is loosely held on the bar.

3. In an anchor device for a partial denture, an elongated bar having an end portion for engaging an anchor member, said bar converging from the anchor, the longitudinal axis of said bar being substantially horizontal, a hollow elongated tapering housing, said housing being complemental to the bar, said housing having one end open and receiving the bar, closure means at the other end of the housing, said housing being adapted to be arranged at the root end of the teeth in a partial denture, the sides of said housing and said bar having aligned apertures, reinforcing means about each of said housing apertures, a pin passing through said housing apertures and secured in one of the housing apertures, said bar aperture being larger than the diameter of the pin, whereby the pin is loosely held on the bar, and anchoring means in the exterior sides of said housing.

CLAWSON N. SKINNER.